Figure 1:
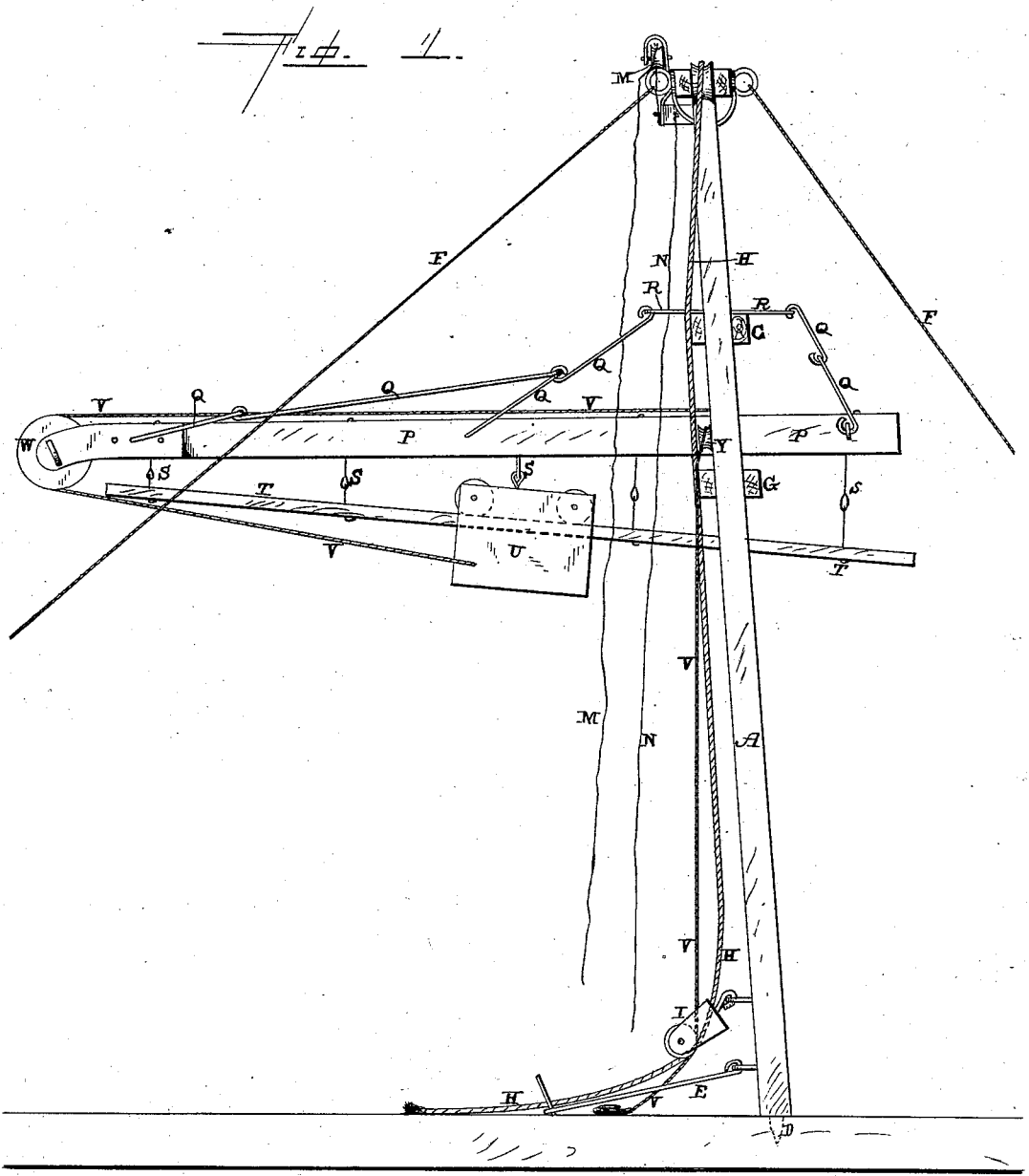

(No Model.) 2 Sheets—Sheet 1.

J. BENSON.
HAY ELEVATOR.

No. 347,680. Patented Aug. 17, 1886.

Witnesses.
L. F. Gardner
A. W. Brecht

Inventor.
Jos. Benson,
per J. A. Lehmann,
Atty (No Model.) 2 Sheets—Sheet 2.
J. BENSON.
HAY ELEVATOR.
No. 347,680. Patented Aug. 17, 1886.
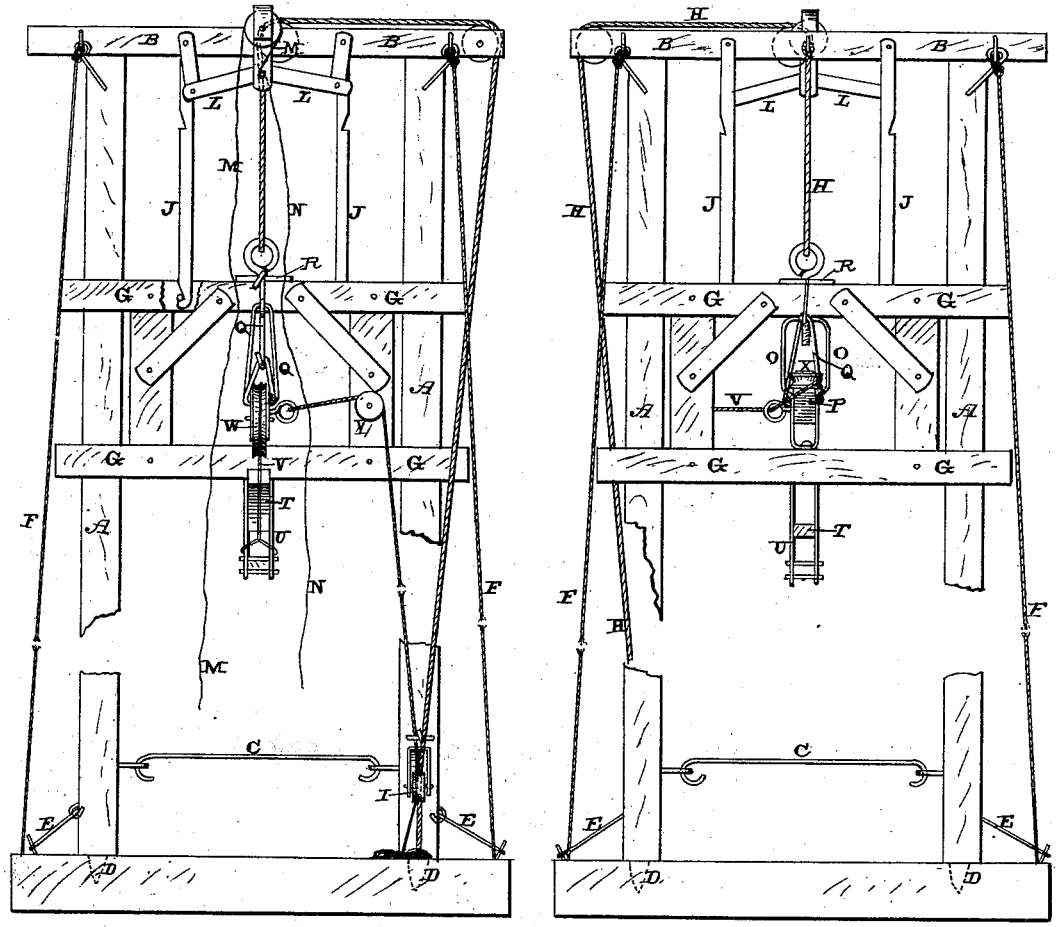
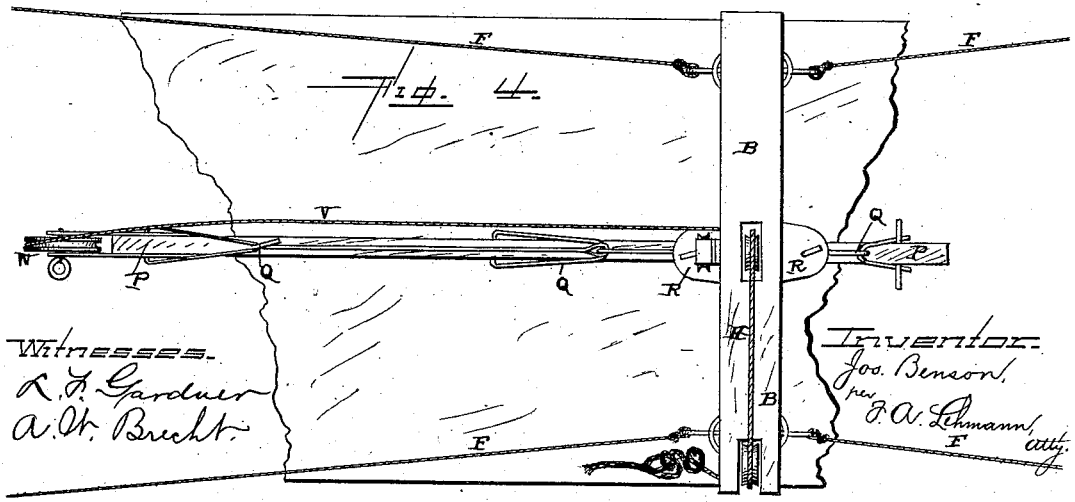
Witnesses
R. T. Gardner
A. W. Brecht
Inventor
Jos. Benson
per J. A. Lehmann, atty.

UNITED STATES PATENT OFFICE.

JOSEPH BENSON, OF CAPRON, IOWA.

HAY-ELEVATOR.

SPECIFICATION forming part of Letters Patent No. 347,680, dated August 17, 1886.

Application filed March 12, 1886. Serial No. 194,949. (No model.)

*To all whom it may concern:*

Be it known that I, JOSEPH BENSON, of Capron, in the county of Marshall and State of Iowa, have invented certain new and useful Improvements in Hay-Elevators; and I do hereby declare the following to be a full, clear, and exact description of the invention, such as will enable others skilled in the art to which it pertains to make and use it, reference being had to the accompanying drawings, which form part of this specification.

My invention relates to an improvement in hay-elevators; and it consists in, first, the combination of the uprights, the vertically-moving frame, the supporting-frame, and the track, with the hooks, the operating-plates connected thereto, and the cords or ropes for moving the plates; second, the combination of the uprights, the vertically-moving frame, the swiveled loop placed in the frame, the arm pivoted in the loop and carrying the guiding-pulleys, the track, the carriage, and the operating-rope for moving the carriage; third, the combination of the supporting-arm, the swiveled loop, the swiveled plate upon the top of the frame, the brace-rods, the track, the carriage, and operating-rope, all of which will be more fully described hereinafter.

The object of my invention is to so construct the different parts that the track and carrier can be lowered so as to receive the load of hay, and then raised and the track turned laterally in any desired direction, so that the hay can be deposited on any part of the stack or in any part of the building.

Figure 1 is a side elevation of a hay elevator and stacker embodying my invention. Figs. 2 and 3 are views taken from opposite ends. Fig. 4 is a plan view.

A represents two poles, uprights, or guides, which are connected together at their upper ends by the cross-piece B, and at their lower ends by a suitable connecting-rod, C. Each one of these poles or uprights has a suitable projection, D, connected to its under side for catching in the ground, and connected to each one of the poles, slightly above their lower ends, is a stay-rod, E. These rods E are fastened to stakes driven into the ground at their outer ends, and serve to assist in raising the poles or frame-work into position, by means of a jack or any other suitable mechanism employed for that purpose. These stay-rods prevent the lower ends of the poles from being drawn toward the jack or other lifting mechanism, and thus hold them while they are being raised into a vertical position. After the poles are raised into a vertical position they are secured by means of any suitable number of guy-ropes, F, which may extend in any suitable direction.

The two poles A form vertical guideways or tracks, between which the sliding frame G moves vertically. This frame consists of two horizontal timbers and two vertical ones, which unite the horizontal timbers, as shown. Connected to the top of this sliding frame is the rope H, which passes up over suitable guiding-pulleys on the cross-piece B, and down through the guiding-pulley I, which is attached to one of the uprights A. When the hay-fork is to be loaded, the sliding frame carrying the track and carriage is lowered to any suitable point, and then, after the hay-fork has been loaded, the sliding frame G is raised into position again.

For the purpose of supporting the sliding frame G in a raised position while the hay-carrier moves the load of hay to the desired point, the two pivoted supporting-hooks J are used. These two hooks J are provided with notches or recesses on their outer sides, and the lower ends of the hooks are made to pass through suitable openings made in the top of the sliding frame as it is raised. These hooks are pivoted at their upper ends upon the cross-piece B, and these two hooks are connected together by the two pivoted plates L, which are fastened together at their inner ends. Connected to the inner ends of these two plates L where they are fastened together is an operating cord or rope, M, which passes through suitable guiding-pulleys down to the ground. Also connected to these plates is a second rope, N, which extends down to the ground. By pulling upon the rope M at any time the inner ends of the plates are raised, thus drawing the lower ends of the hooks J inward, and thereby releasing the sliding frame G, so that it will descend. When the cord N is operated, the lower ends of the two hooks J are forced outward, so as to engage with suitable catches on the frame, and thus support it in position. Two notches are formed in the hooks J, so that the sliding frame G can be supported at two different elevations. The notches in the lower ends of the hooks support the sliding frame at one elevation, when the stack is but partially formed, and there is no necessity for raising it any higher. The two upper notches support the frame at the highest point to which it is to be raised.

Swiveled in the center of the sliding frame G is a vertical loop, O, through which one end of the supporting-arm P is passed. This loop is swiveled, so that the arm P can be turned freely from side to side, for the purpose of discharging the hay from the fork upon any part of the stack or in any part of the building. This arm P is supported in a horizontal position by means of a suitable number of brace-rods, Q, which are connected to the frame upon both sides of its pivot, and which brace-rods are connected to the swivel-plate R upon the top of the sliding frame G. As the swivel-plate, the loop, and the arm P all turn together in the frame G, the outer or longer end of the arm can be moved laterally in any direction. Extending from the under side of this arm P by suitable connecting-rods, S, is the track T, upon which the carrier U moves back and forth in the usual manner. The operating-rope V is connected to one end of the carriage, passes around the pulley W at the outer end of the arm P, then passes around the pulley X, in the swiveled loop, then around the pulley Y and down under the pulley I, where it is connected to the horse or other elevating-power. To this carriage U is to be attached a hay-fork or other means for raising the hay. When the power is applied to the operating-rope after the sliding frame has been raised, the carriage is moved outward upon its track to any desired point, and then the track can be moved laterally by means of ropes attached to the short end of the arm P.

The fork can be loaded by having it descend from the carriage without the necessity of lowering the sliding frame, or the fork can be attached to the under side of the carriage and then the sliding frame be lowered upon the load of hay, and the slide be raised again when the hay is to be deposited upon the stack or in any desired part of the building.

In case this machine is to be used in fields for simply forming stacks, it can be constructed as here shown, or in any other way that may be preferred, and can be moved around from place to place at the will of the operator. In case it is to be used in a building, the uprights A may be fixed permanently in place and form a part of the interior work of the barn.

The machine is equally well adapted for forming stacks in the field or for elevating the hay into any desired part of the barn.

Having thus described my invention, I claim—

1. The combination of the uprights, the vertically-moving frame G, the supporting-frame, and the track, with the hooks J, the operating-plates connected thereto, and the cords or ropes for moving the plates, substantially as set forth.

2. The combination of the uprights, the vertically-moving frame, the swiveled loop placed in the frame, the arm P, pivoted in the loop and carrying the guiding-pulleys W X, the track T, the carriage, and the operating-rope for moving the carriage, substantially as specified.

3. The combination of the supporting-arm P, the swiveled loop, in which the arm P is pivoted, the swiveled plate upon the top of the frame, the brace-rods connected to the arm P, the track connected to the arm P, the carriage, and operating-rope for moving the carriage, substantially as shown and described.

In testimony whereof I affix my signature in presence of two witnesses.

JOSEPH BENSON.

Witnesses:
F. M. TRIPLETT,
A. SCHRADER.